(12) United States Patent
Kimura

(10) Patent No.: US 9,723,480 B2
(45) Date of Patent: *Aug. 1, 2017

(54) INFORMATION PROCESSING DEVICE, SERVER DEVICE, DATA COMMUNICATION SYSTEM, DATA COMMUNICATION METHOD, AND COMPUTER-READABLE STORAGE MEDIUM STORING DATA COMMUNICATION PROGRAM

(71) Applicant: NINTENDO CO., LTD., Kyoto-shi, Kyoto (JP)

(72) Inventor: Masato Kimura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,180

(22) Filed: Mar. 1, 2016

(65) Prior Publication Data

US 2016/0183082 A1 Jun. 23, 2016

Related U.S. Application Data

(63) Continuation of application No. 13/425,769, filed on Mar. 21, 2012, now Pat. No. 9,313,653.

(30) Foreign Application Priority Data

Sep. 26, 2011 (JP) ................................. 2011-209729

(51) Int. Cl.
| | |
|---|---|
| *G06F 15/16* | (2006.01) |
| *H04W 8/24* | (2009.01) |
| *H04W 76/02* | (2009.01) |
| *H04W 4/06* | (2009.01) |
| *H04W 84/04* | (2009.01) |
| *H04W 68/00* | (2009.01) |
| *H04W 84/12* | (2009.01) |

(52) U.S. Cl.
CPC .............. *H04W 8/245* (2013.01); *H04W 4/06* (2013.01); *H04W 76/02* (2013.01); *H04W 68/005* (2013.01); *H04W 84/047* (2013.01); *H04W 84/12* (2013.01)

(58) Field of Classification Search
CPC ....... H04W 8/245; H04W 4/06; H04W 76/02; H04W 84/12; H04W 68/005; H04W 84/047
See application file for complete search history.

(56) References Cited

U.S. PATENT DOCUMENTS

| | | | |
|---|---|---|---|
| 6,289,377 B1 | 9/2001 | Lalwaney | |
| 6,678,732 B1 | 1/2004 | Mouko | |
| 2002/0067284 A1* | 6/2002 | Chamberlain | .......... H04L 43/06 340/870.02 |
| 2004/0210649 A1 | 10/2004 | Bhogal et al. | |
| 2008/0091817 A1* | 4/2008 | Mardirossian | ...... H04L 12/2602 709/224 |
| 2009/0129338 A1* | 5/2009 | Horn | ..................... H04W 48/10 370/331 |
| 2009/0210518 A1 | 8/2009 | Verma | |

FOREIGN PATENT DOCUMENTS

| | | |
|---|---|---|
| JP | 2010-109777 | 5/2010 |
| JP | 2010-258506 | 11/2010 |
| JP | 2011-053844 | 3/2011 |

OTHER PUBLICATIONS

Japanese Patent Office, "Office Action," issued in connection with Japanese Patent Application No. 2011-209729, dated Aug. 28, 2015 (2 pages).

* cited by examiner

*Primary Examiner* — Brian Whipple
(74) *Attorney, Agent, or Firm* — Nixon & Vanderhye P.C.

(57) ABSTRACT

An example mobile terminal is a terminal for transmitting and receiving data to and from a server device via an access point by wireless communication. The mobile terminal includes an identification information storage unit configured to store a terminal ID, a signal receiver configured to receive a broadcast signal containing a plurality of terminal IDs transmitted from the server device via the access point, an ID determiner configured to determine whether or not any of the terminal IDs contained in the received signal corresponds to the terminal ID of this mobile terminal, a connection requester configured to, when the ID determiner determines that one of the terminal IDs corresponds to the terminal ID of this mobile terminal, request a wireless connection to the access point, and a data communicator configured to transmit or receive data to or from the server device via the access point by wireless communication.

10 Claims, 12 Drawing Sheets

FIG. 5

| TERMINAL ID | VERSION OF DOWNLOADED PROGRAM |
|---|---|
| ⋮ | ⋮ |
| 001 | Ver.2 |
| 002 | Ver.2 |
| 003 | Ver.2 |
| 004 | Ver.2 |
| 005 | Ver.2 |
| 006 | Ver.1 |
| 007 | Ver.1 |
| 008 | Ver.1 |
| 009 | Ver.1 |
| 010 | Ver.1 |
| ⋮ | ⋮ |

FIG. 9

| TERMINAL ID | DATE AND TIME OF COMPLETION OF UPLOADING |
|---|---|
| ⋮ | ⋮ |
| 001 | 2011/8/1 10:02 |
| 002 | 2011/8/1 10:05 |
| 003 | 2011/8/1 10:03 |
| 004 | 2011/8/1 10:04 |
| 005 | 2011/8/1 10:04 |
| 006 | — |
| 007 | — |
| 008 | — |
| 009 | — |
| 010 | — |
| ⋮ | ⋮ |

FIG. 12

| TERMINAL ID | FLAG OF COMPLETION OF DOWNLOADING |
|---|---|
| ⋮ | ⋮ |
| 001 | ON |
| 002 | ON |
| 003 | ON |
| 004 | ON |
| 005 | ON |
| 006 | OFF |
| 007 | OFF |
| 008 | OFF |
| 009 | OFF |
| 010 | OFF |
| ⋮ | ⋮ |

INFORMATION PROCESSING DEVICE, SERVER DEVICE, DATA COMMUNICATION SYSTEM, DATA COMMUNICATION METHOD, AND COMPUTER-READABLE STORAGE MEDIUM STORING DATA COMMUNICATION PROGRAM

CROSS REFERENCE TO RELATED APPLICATION

This is a continuation of U.S. application Ser. No. 13/425,769, filed Mar. 21, 2012, which claims priority to Japanese Patent Application No. 2011-209729, filed Sep. 26, 2011, the disclosures of both of which are incorporated herein by reference in their entirety.

FIELD

The present exemplary embodiment relates to information processing devices, server devices, data communication systems, data communication methods, and computer-readable storage media storing data communication programs which are used to transmit and receive data via a relay device by wireless communication.

BACKGROUND AND SUMMARY

Conventionally, wireless data communication via a relay device has been achieved between a mobile terminal and a server device. An example known wireless communication scheme is the wireless LAN scheme specified by IEEE 802.11.

In the above conventional wireless LAN scheme, however, if a large number of mobile terminals are in an area which allows wireless communication with a relay device, a plurality of mobile terminals would simultaneously request the relay device to provide wireless connection. In this case, lack of resources for wireless connection may occur in the relay device, resulting in a trouble in data communication between mobile terminals and the server device.

Therefore, the present exemplary embodiment has been made in view of the above problem. It is an object of the present exemplary embodiment to provide an information processing device, server device, data communication system, data communication method, and data communication program which are used to reduce the processing load of a relay device, thereby achieving smooth data communication.

To achieve the object, an information processing device according to an aspect of the present exemplary embodiment is for transmitting and receiving data to and from a server device via a relay device by wireless communication. The information processing device includes an identification information storage unit configured to store terminal identification information for identifying the information processing device, a signal receiver configured to receive a broadcast signal containing at least one piece of identification information transmitted from the server device via the relay device, a determiner configured to determine whether or not any of the at least one piece of identification information contained in the signal received by the signal receiver corresponds to the terminal identification information, a connection requester configured to, when the determiner determines that one of the at least one piece of identification information corresponds to the terminal identification information, request a wireless connection to the relay device, and a data communicator configured to transmit or receive data to or from the server device via the relay device by wireless communication.

A server device according to another aspect of the present exemplary embodiment is for transmitting and receiving data to and from an information processing device or devices via a relay device by wireless communication. The server device includes an identification information storage unit configured to store at least one piece of terminal identification information for identifying the information processing device or devices, a signal transmitter configured to transmit, via the relay device, a broadcast signal containing, at least, at least one piece of identification information extracted from the at least one piece of terminal identification information, and a data communicator configured to transmit or receive data to or from the information processing device or devices via the relay device by wireless communication.

A data communication system according to another aspect of the present exemplary embodiment is one in which data is transmitted and received between a server device and an information processing device or devices via a relay device by wireless communication. In the data communication system, each of the information processing device or devices includes an identification information storage unit configured to store terminal identification information for identifying the each of the information processing device or devices, a signal receiver configured to receive a broadcast signal containing at least one piece of identification information transmitted from the server device via the relay device, a determiner configured to determine whether or not any of the at least one piece of identification information contained in the signal received by the signal receiver corresponds to the terminal identification information, a connection requester configured to, when the determiner determines that one of the at least one piece of identification information corresponds to the terminal identification information, request a wireless connection to the relay device, and a data communicator configured to transmit or receive data to or from the server device via the relay device by wireless communication. The server device includes an identification information storage unit configured to store at least one piece of terminal identification information for identifying the information processing device or devices, a signal transmitter configured to transmit, via the relay device, a broadcast signal containing, at least, at least one piece of identification information extracted from the at least one piece of terminal identification information, and a data communicator configured to transmit or receive data to or from the information processing device or devices via the relay device by wireless communication.

A data communication method according to another aspect of the present exemplary embodiment is for transmitting and receiving data between a server device and an information processing device or devices via a relay device by wireless communication. The data communication method includes a signal transmission step of causing the server device to transmit a broadcast signal containing, at least, at least one piece of identification information extracted from at least one piece of previously stored terminal identification information for identifying the information processing device or devices, via the relay device, a signal reception step of causing the information processing device or devices to receive the signal from the server device via the relay device, a determination step of causing each of the information processing device or devices to determine whether or not any of the at least one piece of identification information contained in the signal received in the signal reception step corresponds to the previously stored terminal identification information for identifying the each of the information processing device or devices, a connection request step of causing each of the information processing device or devices to, when the determination step determines that one of the at least one piece of identification information corresponds to the previously stored terminal identification information for identifying the each of the information processing device or devices, request a wireless connection to the relay device, and a data communication step of causing the information processing device or devices and the server device to transmit or receive data via the relay device by wireless communication.

A data communication program according to another aspect of the present exemplary embodiment is for transmitting and receiving data to and from a server device via a relay device by wireless communication. The data communication program causes a computer to execute receiving a broadcast signal containing at least one piece of identification information transmitted from the server device via the relay device, determining whether or not any of the at least one piece of identification information contained in the received signal corresponds to previously stored terminal identification information for identifying an information processing device, requesting a wireless connection to the relay device when it is determined that one of the at least one piece of identification information corresponds to the previously stored terminal identification information for identifying the information processing device, and transmitting or receiving data to or from the server device via the relay device by wireless communication.

A data communication program according to another aspect of the present exemplary embodiment is for transmitting and receiving data to and from an information processing device via a relay device by wireless communication. The data communication program causes a computer to execute transmitting a broadcast signal containing, at least, at least one piece of identification information extracted from at least one of previously stored terminal identification information for identifying an information processing device or devices, and transmitting or receiving data to or from the information processing device or devices via the relay device by wireless communication.

According to the above aspects of the present exemplary embodiment, the server device transmits a broadcast signal containing at least one piece of identification information extracted from a plurality of pieces of previously stored terminal identification information. After receiving the signal, an information processing device, when one of the at least one piece of identification information contained in the signal corresponds to the previously stored terminal identification information, requests a wireless connection to the relay device, and transmits or receives data to the server device via the relay device. As a result, data communication is executed with information processing devices (the other end of communication) the number of which is limited by the server device. Therefore, the processing load of the relay device is reduced, whereby lack of resources for wireless connection is prevented, resulting in smooth data communication between the server device and the information processing devices.

In the above information processing device of the aspect, the signal receiver preferably receives the signal in a state before an authentication procedure and a connection procedure are executed between the information processing device and the relay device. In this case, the signal can be received from the relay device without execution of the authentication and the association between the relay device and the information processing device, and therefore, lack of resources in the relay device can be reliably prevented.

The signal receiver preferably receives the signal in a synchronization scheme. In this case, information, such as the identification information etc., can be efficiently read from the signal received from the relay device without execution of the authentication and the association between the relay device and the information processing device.

The signal receiver preferably receives the signal containing a command to request a wireless connection to the relay device, and the connection requester preferably requests the wireless connection when the signal contains the command. With this configuration, data communication between the server device and the information processing device can be flexibly controlled.

The data communicator preferably uploads data to the server device via the relay device. The data communicator preferably downloads data from the server device via the relay device. In this case, data communication between the server device and the information processing device can be controlled in a specific communication direction.

The signal receiver preferably receives a plurality of pieces of the identification information, and the determiner preferably determines whether or not any of the plurality of pieces of identification information corresponds to the terminal identification information. In this case, a plurality of the information processing devices can be provided for which a wireless connection to the relay device is established.

The terminal identification information is preferably used to identify a specific information processing device. In this case, the number of the information processing devices for which a wireless connection to the relay device is established can be finely limited.

In the above server device of the aspect, the signal transmitter preferably repeatedly transmits the signal containing the at least one piece of identification information successively updated based on a transmission/reception state of the data between the server device and the information processing device or devices. In this case, data communication between the server device and the information processing device or devices can be reliably completed.

The server device preferably further includes a communication state storage unit configured to manage communication state information indicating the data transmission/reception state between the server device and the information processing device or devices, in association with the terminal identification information, and an identification information extractor configured to extract at least one piece of identification information from the at least one piece of terminal identification information stored in the identification information storage unit, based on the communication state information. The signal transmitter preferably transmits a signal containing the at least one piece of identification information extracted by the identification information extractor. With this configuration, data communication between the server device and a plurality of the information processing devices can be reliably completed while the processing load of the relay device is reduced.

According to the present exemplary embodiment, the processing load of the relay device is reduced, resulting in smooth data communication.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 5 is a diagram showing an example non-limiting structure of data stored in an identification information storage unit 202 of FIG. 4;

FIG. 9 is a diagram showing an example non-limiting structure of data stored in the identification information storage unit 202 in a variation of the present exemplary embodiment;

FIG. 12 is a diagram showing an example non-limiting structure of data stored in the identification information storage unit 202 in another variation of the present exemplary embodiment.

DETAILED DESCRIPTION OF NON-LIMITING EXAMPLE EMBODIMENTS

Figure 1:
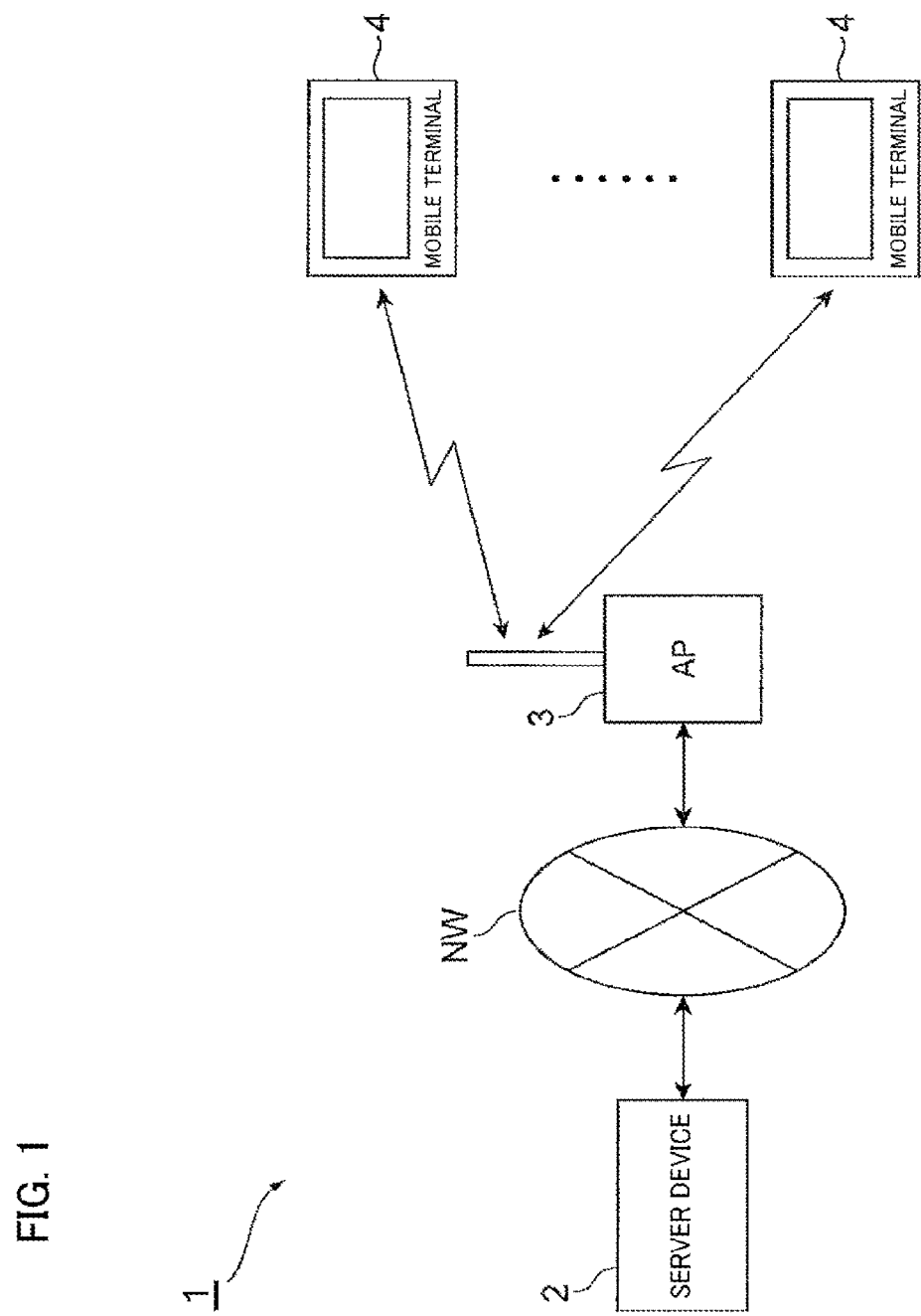
FIG. 1 is a diagram schematically showing an example non-limiting configuration of a data communication system 1 according to a preferred example of the present exemplary embodiment.

Non-limiting examples of an information processing device, server device, data communication system, data communication method, and data communication program according to the present exemplary embodiment will be described in detail hereinafter with reference to the accompanying drawings. Note that like parts are indicated by like reference numeral and will not be redundantly described.

FIG. 1 is a diagram schematically showing an example non-limiting configuration of a data communication system 1 according to a preferred example of the present exemplary embodiment. The data communication system 1 of FIG. 1 is a system in which data communication between mobile terminals and a server device via a relay device is achieved by using a wireless communication scheme, such as the wireless LAN communication scheme specified by IEEE 802.11. In this example, as example data communication, it is assumed that a download program is downloaded from a server device to terminal devices. As shown in FIG. 1, the data communication system 1 includes a server device 2.

The data communication system 1 also includes an access point 3 which is a relay device connected via a communication network NW to the server device 2. For example, the server device 2 and the access point 3 are always connected together via the communication network NW including the Internet, such as a local area network (LAN), a wide area network (WAN), etc. The data communication system 1 also includes a plurality of mobile terminals 4 which can wirelessly communicate with the access point 3 in accordance with a wireless communication scheme. The mobile terminal 4 is a portable information processing device, such as a handheld game console, a cellular telephone, a personal digital assistance (PDA), a smartphone, a tablet computer, a portable music player, a portable personal computer, etc. The data communication system 1 may include, instead of the portable information processing devices, a plurality of stationary information processing devices which can wirelessly communicate with the access point 3 in accordance with a wireless communication scheme, such as desktop personal computers, DVD recorders, hard disk recorders, etc. Although FIG. 1 shows only a single server device 2, a function described below which is possessed by the server device 2 may be achieved by cooperation of a plurality of server devices.

The mobile terminal 4, when located in an area which allows wireless connection to the access point 3, can receive a broadcast wireless signal transmitted from the access point 3 in a synchronization scheme. The wireless signal which can be synchronously received contains a management frame. The mobile terminal 4 can read various kinds of control information, such as a command etc., from the management frame. Such an operation of the mobile terminal 4 is referred to as "synchronization" or "joining." The mobile terminal 4 also performs mutual authentication (this operation is referred to as "authentication") and mutual association (this operation is referred to as "association") on the access point 3 before starting data communication with the server device 2 via the access point 3. The authentication is performed by the mobile terminal 4 and the access point 3 exchanging management frames called authentication frames. The association is performed by the mobile terminal 4 and the access point 3 exchanging management frames called association frames. After completion of the authentication and the association, data communication between the mobile terminal 4 and the server device 2 via the access point 3 is allowed. Here, in the synchronization operation of the mobile terminal 4, resources for wireless connection, such as an IP address, connection management information, etc. in the access point 3, are not consumed before the authentication and the association are performed. In contrast to this, after the mobile terminal 4 has completed the authentication and the association, resources of the access point 3 are consumed.

Figure 2:
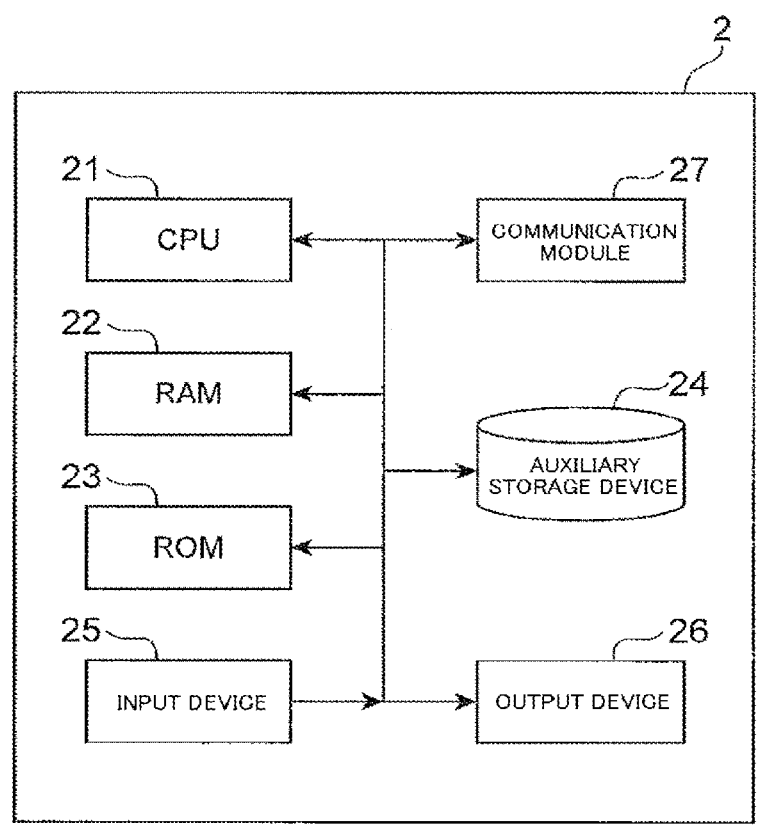
FIG. 2 is a block diagram showing an example non-limiting hardware configuration of a server device 2 of FIG. 1.

Next, hardware and functional configurations of the server device 2 and the mobile terminal 4 will be described in detail As shown in FIG. 2, the server device 2 is physically configured as an information processing device including a CPU 21, a RAM 22 and a ROM 23 (main storage devices), an auxiliary storage device 24 (e.g., a hard disk device etc.), an input device 25 (e.g., a keyboard, a mouse, a floppy (registered trademark) disk drive device, a CD-ROM drive device, a DVD drive device, etc.), an output device 26 (e.g., a display, a loudspeaker, etc.), and a communication module 27 which is responsible for data communication between the server device 2 and the mobile terminal 4 via the communication network NW and the access point 3. Functions achieved by the server device 2 are achieved by loading a predetermined program to hardware, such as the CPU 21, the RAM 22, etc. of FIG. 2; and under control of the CPU 21, operating the communication module 27, the input device 25, and the output device 26 while reading and writing data from and to the RAM 22 and the auxiliary storage device 24.

Figure 3:
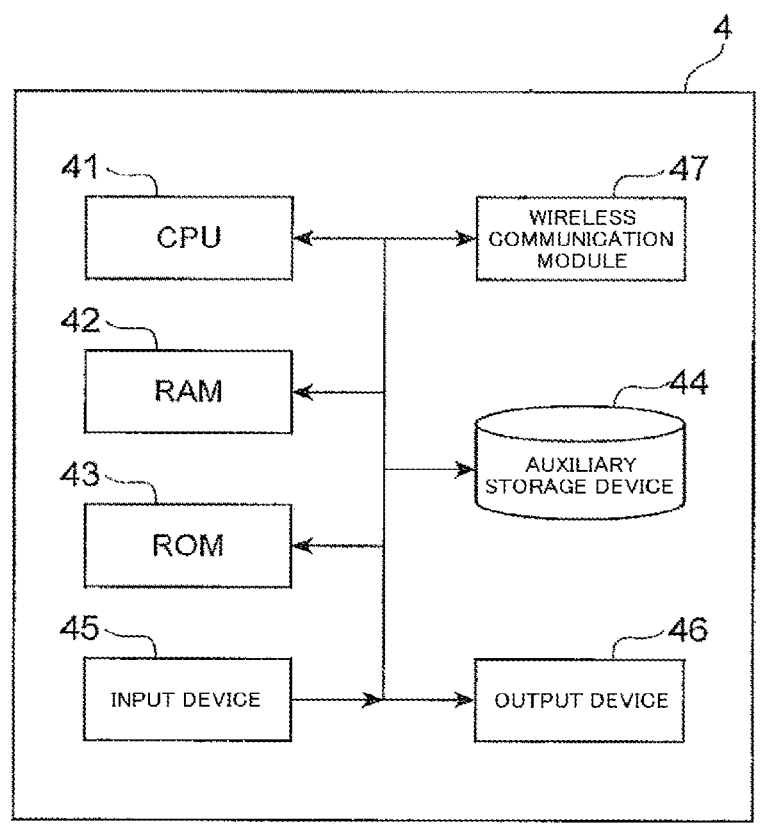
FIG. 3 is a block diagram showing an example non-limiting hardware configuration of a mobile terminal 4 of FIG. 1.

Similarly, as shown in FIG. 3, the mobile terminal 4 is configured as an information processing device including a CPU 41, a RAM 42 and a ROM 43 (main storage devices), an auxiliary storage device 44 (e.g., a hard disk device etc.), an input device 45 (e.g., an input key, a touch panel, a mouse, etc.), an output device 46 (e.g., a display, a loudspeaker, etc.), and a wireless communication module 47 which is responsible for wireless data communication between the mobile terminal 4 and the server device 2 via the access point 3. Functions achieved by the mobile terminal 4 are achieved by loading a predetermined program to hardware, such as the CPU 41, the RAM 42, etc. of FIG. 3; and under control of the CPU 41, operating the wireless communication module 47, the input device 45, and the output device 46 while reading and writing data from and to the RAM 42 and the auxiliary storage device 44.

Figure 4:
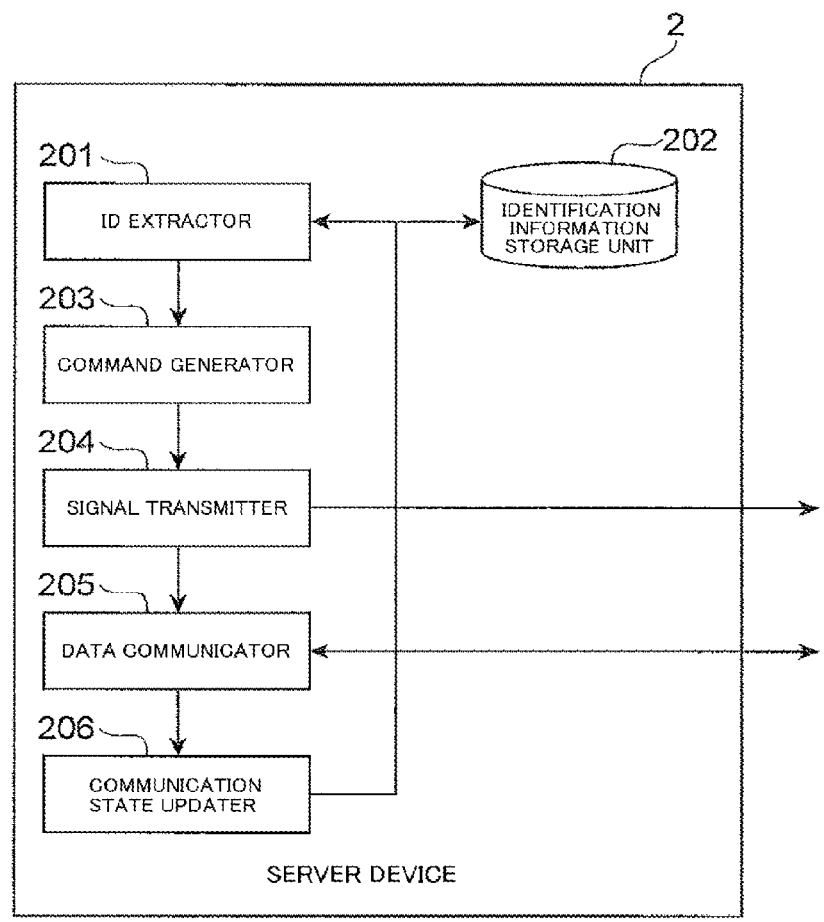
FIG. 4 is a block diagram showing an example non-limiting functional configuration of the server device 2 of FIG. 1.

Referring to FIG. 4, the server device 2 includes an ID extractor (identification information extractor) 201, which is a functional component. The server device 2 also includes an identification information storage unit 202. The ID extractor 201, when receiving an instruction to start a process of downloading a download program to a plurality of mobile terminals 4, extracts a portion (one or more) or all of a plurality of terminal IDs (terminal identification information) previously stored in the identification information storage unit 202. The download process is started, for example, at pre-scheduled times (at regular intervals or at specified times) or at the time when external instruction information is received.

FIG. 5 shows an example non-limiting data structure of the terminal IDs previously stored in the identification information storage unit 202. As shown in FIG. 5, the identification information storage unit 202 stores the terminal IDs "001," "002," . . . for identifying specific mobile terminals 4. The identification information storage unit 202 also manages pieces of communication state information indicating data transmission/reception states between the mobile terminals 4 identified by the respective terminal IDs and the server device 2, in association with the terminal IDs. For example, the terminal ID "001" and "version of downloaded program: Ver. 2" indicating the version of a download program downloaded from the server device 2 to the mobile terminal 4 identified by the terminal ID "001" are stored as a piece of communication state information in association with the terminal ID "001."

Specifically, the ID extractor 201 extracts a terminal ID for which a pre-scheduled data transmission/reception process has not been completed, based on the pieces of communication state information associated with the terminal IDs. More specifically, the ID extractor 201 extracts a predetermined number of terminal IDs corresponding to pieces of communication state information indicating that a program of the latest version has not been completely downloaded. In the example of FIG. 5, ten terminal IDs "006," "007," . . . for which the latest version "Ver. 2" has not been completely downloaded, are extracted.

Referring back to FIG. 4, the server device 2 also includes a command generator 203. The command generator 203 generates command information containing the terminal IDs extracted by the ID extractor 201. The command information is used to request a wireless connection to the access point 3 from the corresponding mobile terminals 4. In this example, a download request command is generated which is used to request a wireless connection to the access point 3 and downloading of a specific download program from the server device 2. For example, such command information contains, in a header portion thereof, the data size of the command information, a predetermined number of terminal IDs, and the number of the terminal IDs contained in the command information, and in a payload portion thereof, information indicating a command type, information indicating a storage source of a file to be downloaded, and information indicating a storage destination of the file to be downloaded or a name of the file at the storage destination.

The server device 2 also includes a signal transmitter 204. The signal transmitter 204 transmits a broadcast signal containing the command information generated by the command generator 203, to the mobile terminals 4 via the access point 3 by wireless communication. Specifically, the signal transmitter 204 includes the command information in a wired transmission signal, such as an Ethernet frame etc., and transmits the wired transmission signal via the communication network NW to the access point 3. The command information contained in the wired transmission signal is included into a wireless transmission signal, such as an IEEE802.11 frame etc., by the access point 3, and the wireless transmission signal is broadcast to the mobile terminals 4. In other words, the access point 3 transmits the wireless transmission signal without specifying a particular destination, and the wireless transmission signal can be received by all mobile terminals 4 located in an area which allows wireless communication with the access point 3.

The server device 2 also includes a data communicator 205. The data communicator 205, after the authentication and the association between the mobile terminal 4 and the access point 3 have been competed, transmits or receives data to or from the mobile terminals 4 via the access point 3 by wireless communication. Specifically, in response to a request from the mobile terminal 4, the server device 2 transmits data to the mobile terminal 4. More specifically, when there is a request for downloading of a specific download program from the mobile terminal 4, the data communicator 205 transmits the download program of the latest version to the mobile terminal 4. Data transmitted by the data communicator 205 is not limited to a download program, and may include various kinds of data, such as audio data, moving image data, still image data, character data, numerical data, etc.

The server device 2 also includes a communication state updater 206. The communication state updater 206 detects a data transmission/reception state between the server device 2 and the mobile terminal 4, and based on the detected transmission/reception state, updates the communication state information of the identification information storage unit 202. Specifically, the communication state updater 206 receives information indicating the data transmission/reception state from the mobile terminal 4 via the data communicator 205, and stores communication state information corresponding to the transmission/reception state into the identification information storage unit 202 in association with the corresponding terminal ID. As an example, when receiving, from the mobile terminal 4 of the terminal ID "001," a notification indicating the completion of downloading of the latest download program, the "version of downloaded program" which is communication state information corresponding to the terminal ID "001" is updated with the latest version "Ver. 2." Here, the communication state updater 206 detects the data transmission/reception state based on the notification from the mobile terminal 4. Alternatively, the data transmission/reception state may be directly monitored and detected.

Figure 6:
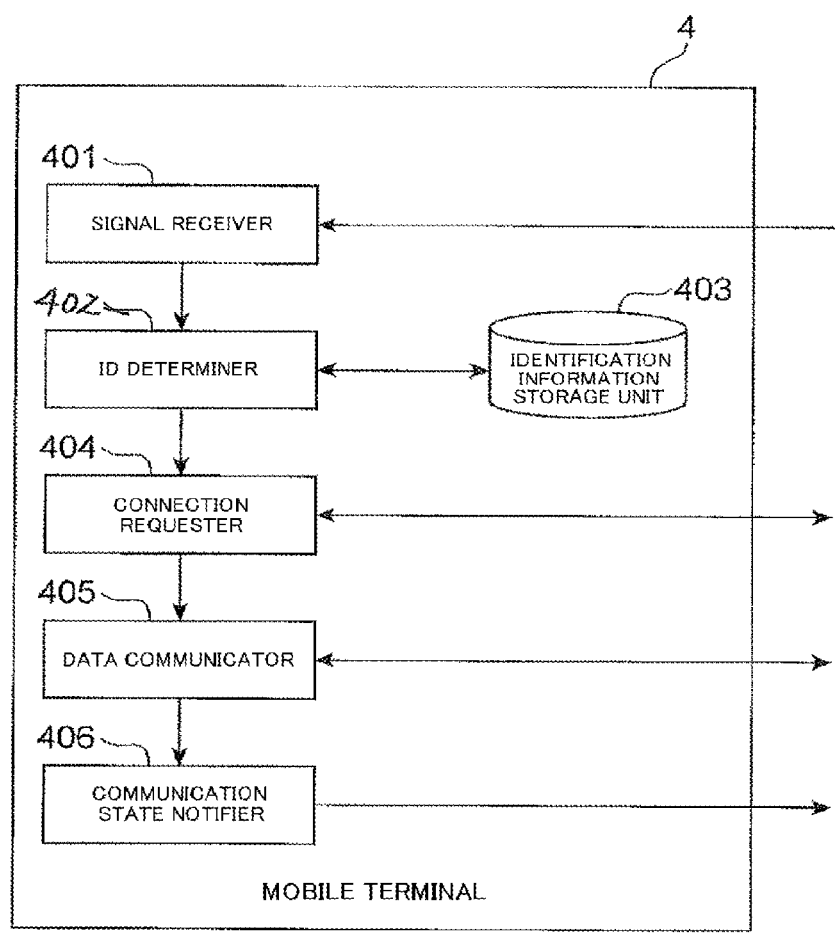
FIG. 6 is a block diagram showing an example non-limiting functional configuration of the mobile terminal 4 of FIG. 1.

Referring to FIG. 6, the mobile terminal 4 includes a signal receiver 401, which is a functional component. The signal receiver 401 receives a signal containing command information from the server device 2 via the access point 3 by wireless communication. Specifically, the signal receiver 401 receives a broadcast wireless transmission signal, such as an IEEE802.11 frame etc., from the access point 3. In other words, a broadcast wireless transmission signal transmitted by the access point 3 without specifying a particular destination, is received by the signal receivers 401 of all mobile terminals 4 located in the area which allows wireless communication with the access point 3. Note that the signal receiver 401 receives the wireless transmission signal by a synchronization operation (joining operation) before an authentication procedure and an association procedure are executed between the mobile terminal 4 and the access point 3.

The mobile terminal 4 also includes an ID determiner 402. The mobile terminal 4 also includes an identification information storage unit 403 which is used to store a specific terminal ID for identifying this mobile terminal 4. When the wireless transmission signal received by the signal receiver 401 contains command information requesting a wireless connection to the access point 3, the ID determiner 402 extracts the command information contained in the wireless transmission signal, and thereafter, extracts a plurality of terminal IDs contained in the command information. Thereafter, the ID determiner 402 determines whether or not any of the extracted terminal IDs corresponds to the terminal ID stored in the identification information storage unit 403 (i.e., the terminal ID of the mobile terminal 4 which includes that ID determiner 402). In this case, the ID determiner 402 may determine whether or not terminal IDs match, or whether or not terminal IDs have a correspondence relationship which identifies the same terminal.

The mobile terminal 4 also includes a connection requester 404. When the ID determiner 402 determines that one of the terminal IDs contained in the command information corresponds to the terminal ID of the mobile terminal 4 which includes that ID determiner 402, the connection requester 404 requests a wireless connection to the access point 3. Specifically, in order to execute the authentication and the association between the mobile terminal 4 and the access point 3, the mobile terminal 4 and the access point 3 exchange authentication frames and connection frames. After the authentication and the association are completed, data transmission/reception between the mobile terminal 4 and the server device 2 via the access point 3 is allowed.

The mobile terminal 4 also includes a data communicator 405. After the authentication and the association between the connection requester 404 and the access point 3 are completed, the data communicator 405 transmits or receives data to or from the server device 2 via the access point 3 by wireless communication. Specifically, the data communicator 405 requests the server device 2 to download data, and receives the data from the server device 2. More specifically, the data communicator 405 requests the server device 2 to download a specific download program, whereby the download program of the latest version is downloaded from the server device 2 to the data communicator 405. Data received by the data communicator 405 is not limited to a download program, and may be various kinds of data, such as audio data, moving image data, still image data, character data, numerical data, etc.

The mobile terminal 4 also includes a communication state notifier 406. The communication state notifier 406 detects the data transmission/reception state between the mobile terminal 4 and the server device 2, generates communication state information corresponding to the detected transmission/reception state, and notifies the server device 2 of the communication state information via the access point 3. Specifically, the communication state notifier 406 checks the correctness of data received from the server device 2 by the data communicator 405, and generates communication state information corresponding to the correctness. More specifically, the communication state notifier 406 generates communication state information corresponding to the correctness of a latest download program downloaded from the server device 2. The data correctness may be determined by checking an error message during data transmission/reception between the mobile terminal 4 and the server device 2 or by performing error detection using a parity bit etc. attached to data. Here, in addition to checking the correctness of data, the communication state notifier 406 may check the correctness of a control frame which is exchanged between the mobile terminal 4 and the server device 2 or the access point 3 during data communication. The communication state notifier 406 may be provided in the server device 2 so that the data transmission/reception state is monitored and detected in the server device 2.

Figure 7:
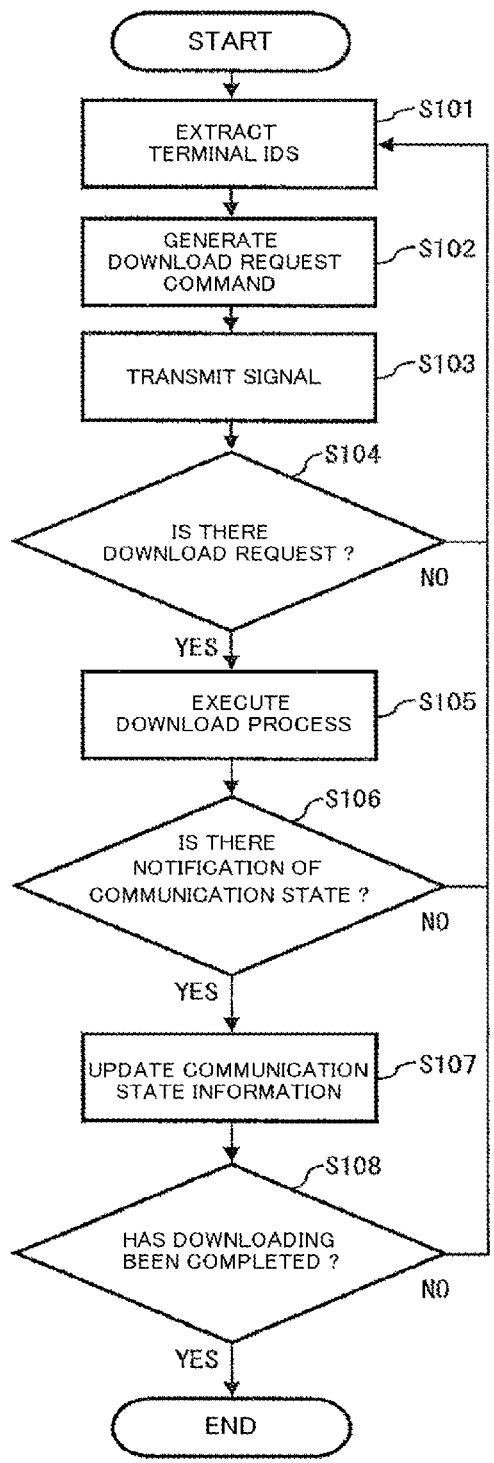
FIG. 7 is a flowchart showing an example non-limiting data communication method of the server device 2 in the data communication system 1 of FIG. 1.
Figure 8:
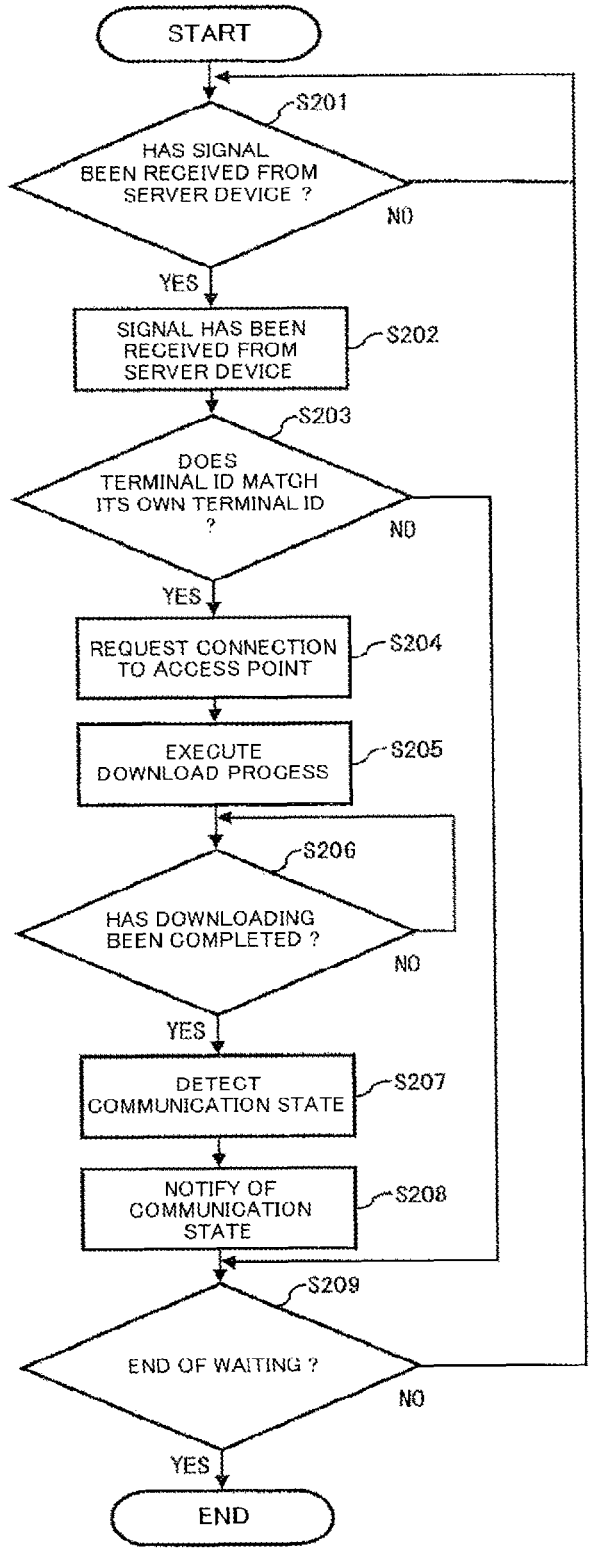
FIG. 8 is a flowchart showing an example non-limiting data communication method of the mobile terminal 4 in the data communication system 1 of FIG. 1.

Next, a method for performing data communication between the server device 2 and the mobile terminal 4 via the access point 3 in the data communication system 1 will be described. FIG. 7 is a flowchart showing an example non-limiting data communication procedure of the server device 2 in the data communication system 1. FIG. 8 is a flowchart showing an example non-limiting data communication procedure of the mobile terminal 4 in the data communication system 1.

Firstly, the data communication procedure of the server device 2 will be described with reference to FIG. 7. When a data download process to the mobile terminal 4 is started at a pre-scheduled time in the server device 2, the ID extractor 201 of the server device 2 extracts a portion of the terminal IDs stored in the identification information storage unit 202 (step S101). Here, for example, the start of the data download process may be triggered when it is detected that data to be downloaded, such as a download program etc., has been updated in the server device 2 or when the server device 2 has received an external instruction. Next, the command generator 203 of the server device 2 generates a download request command which is used to request the mobile terminals 4 to download data, where the download request command contains the extracted terminal IDs (step S102). Thereafter, the signal transmitter 204 of the server device 2 transmits a broadcast signal containing the download request command (step S103). Thereafter, the data communicator 205 of the server device 2 determines whether or not the download request was received from any of the mobile terminals 4 during a predetermined period of time (step S104). If the determination result is negative (NO in step S104), the process returns to step S101, in which extraction of terminal IDs and transmission of the broadcast signal are repeated.

On the other hand, if the determination result is positive (YES in step S104), the data communicator 205 performs a download process to the mobile terminal 4 which is a transmission source of the download request (step S105).

Next, the communication state updater 206 of the server device 2 determines whether or not it has been notified of a communication state (data transmission/reception state) by the mobile terminal 4 which is a transmission source of the download request (step S106). If the determination result is negative (NO in step S106), the process returns to step S101, in which extraction of terminal IDs and transmission of the broadcast signal are repeated. On the other hand, if the determination result is positive (YES in step S106), the communication state updater 206 updates the communication state information of the corresponding terminal ID in the identification information storage unit 202 based on the communication state (step S107).

Thereafter, the communication state updater 206 references the communication state information in the identification information storage unit 202 to determine whether or not the download process has been successfully completed for the mobile terminals 4 to which data should be downloaded (step S108). If the determination result is positive (YES in step S108), the data communication process is ended. On the other hand, if the determination result is negative (NO in step S108), the process returns to step S101, in which extraction of terminal IDs based on the updated communication state information and transmission of the broadcast signal are repeated.

The data communication procedure of the mobile terminal 4 will be described with reference to FIG. 8. Initially, when the mobile terminal 4 begins waiting for a signal from the server device 2, the signal receiver 401 of the mobile terminal 4 determines whether or not a signal containing a download request command has been received (step S201). If the determination result is negative (NO in step S201), the mobile terminal 4 continues to wait for a signal from the server device 2. On the other hand, if the determination result is positive (YES in step S201), the signal receiver 401 has received a signal containing a download request command from the server device 2 via the access point 3 (step S202).

Thereafter, the ID determiner 402 of the mobile terminal 4 determines whether or not any of the terminal IDs contained in the download request command corresponds to the terminal ID of this mobile terminal 4 (step S203). If the determination result is negative (NO in step S203), the process proceeds to step S209. On the other hand, if the determination result is positive (YES in step S203), the connection requester 404 of the mobile terminal 4 requests a wireless connection to the access point 3 (step S204).

Next, after the authentication and the association between the access point 3 and the mobile terminal 4 are completed, a data download process is executed between the data communicator 405 of the mobile terminal 4 and the data communicator 205 of the server device 2 (step S205). Moreover, the communication state notifier 406 of the mobile terminal 4 detects a data transmission/reception state (step S207). Thereafter, the communication state notifier 406 of the mobile terminal 4 notifies the server device 2 of communication state information corresponding to the detected transmission/reception state (step S208). Thereafter, it is determined whether or not the mobile terminal 4 has received an external instruction to end the waiting (step S209). If the determination result is positive (YES in step S209), the data communication process in the mobile terminal 4 is ended. On the other hand, if the determination result is negative (NO in step S209), the process returns to step S201, in which the process of waiting for a signal from the server device 2 is repeated.

Next, a data communication program which causes an information processing device (a computer) to operate as the server device 2 and the mobile terminal 4 will be described. For each of the server device 2 and the mobile terminal 4 which are information processing devices having the respective hardware configurations of FIGS. 2 and 3, a data communication program is provided as a computer data signal embodied in a carrier via a network. The server device 2 and the mobile terminal 4 store the data communication program provided via the network in respective memories (e.g., the auxiliary storage devices 24 and 44, etc.), and can execute the data communication program. The server device 2 and the mobile terminal 4 can access the data communication program stored in the respective memories. The data communication program can allow the server device 2 and the mobile terminal 4 to operate as those of this example.

The example data communication program according to the present exemplary embodiment may be provided and stored in a recording medium. Examples of the recording medium include recording media such as a floppy (registered trademark) disk, a CD-ROM, a DVD, etc., semiconductor memories such as a ROM etc., and the like. In this case, the data communication program is stored into the memories of the server device 2 and the mobile terminal 4 using a reading device, such as a floppy (registered trademark) disk drive device, a CD-ROM drive device, a DVD drive device, etc.

According to the above data communication system 1 and the above data communication method using the system 1, the server device 2 transmits a broadcast signal containing a portion (one or more) or all of a plurality of previously stored terminal IDs. After receiving the signal, a mobile terminal 4, if one of the terminal IDs contained in the signal corresponds to the terminal ID of this terminal, transmits or receives data to or from the server device 2 via the access point 3 after requesting a wireless connection from the access point 3. As a result, data communication is executed with the mobile terminals 4 (the other end of communication) the number of which is limited by the server device 2. Therefore, the processing load of the access point 3 is reduced, whereby lack of resources for wireless connection is prevented, resulting in smooth data communication between the server device 2 and the mobile terminals 4. In addition, a prohibitively large number of accesses are prevented from being simultaneously made from the mobile terminals 4 to the server device 2, whereby the processing load of the server device 2 is reduced and therefore the process efficiency of the data communication system 1 is improved.

In particular, the mobile terminal 4 receives, from the access point 3, a broadcast signal transmitted by a synchronization (joining) operation, whereby the consumption of resources of the access point 3 by mobile terminals 4 other than those selected by the server device 2 can be reduced. As a result, lack of resources of the access point 3 can be reliably prevented. Because a signal is received by the synchronization operation, a command from the server device 2 can be efficiently received before the completion of the authentication and the association.

The server device 2 also repeatedly transmits a signal containing a plurality of terminal IDs which are successively updated based on the data transmission/reception state between the service device 2 and the mobile terminal 4, whereby mobile terminals 4 (the other end of communication) which perform data communication with the server device 2 can be appropriately selected based on the data transmission/reception state. As a result, when it is desirable that data be synchronously downloaded to a large number of mobile terminals 4 or when it is desirable that data be uploaded from every one of a large number of mobile terminals 4, data communication can be safely completed.

The present exemplary embodiment is not limited to the above examples. While, in the above examples, data is downloaded from the server device 2 to the mobile terminal 4, data may be uploaded from the mobile terminal 4 to the server device 2.

Figure 10:
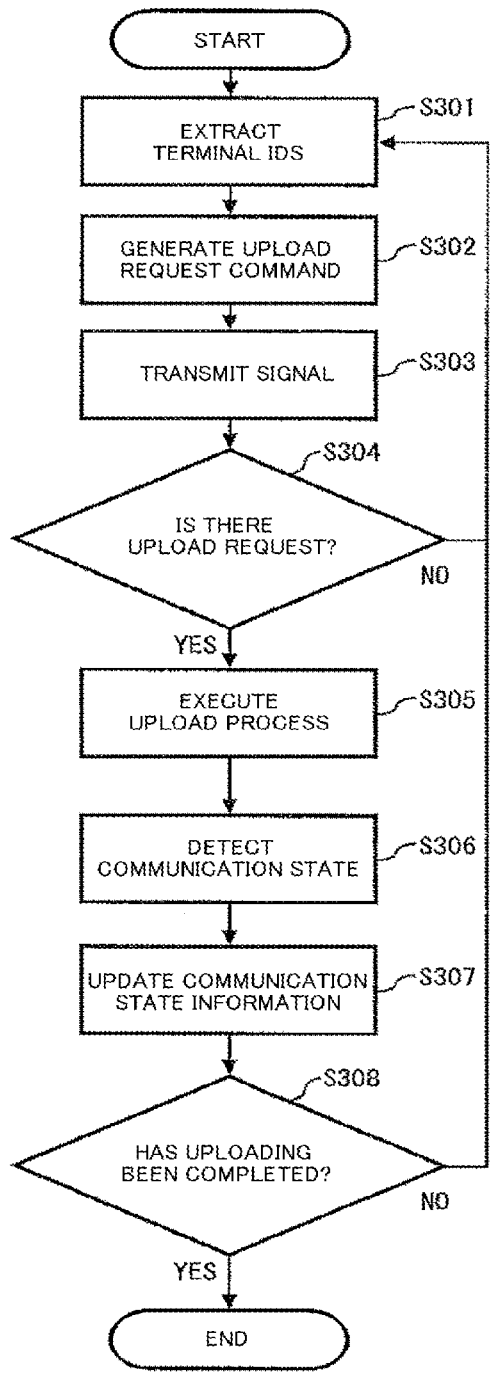
FIG. 10 is a flowchart showing an example non-limiting data communication method of the server device 2 in the variation of the present exemplary embodiment.
Figure 11:
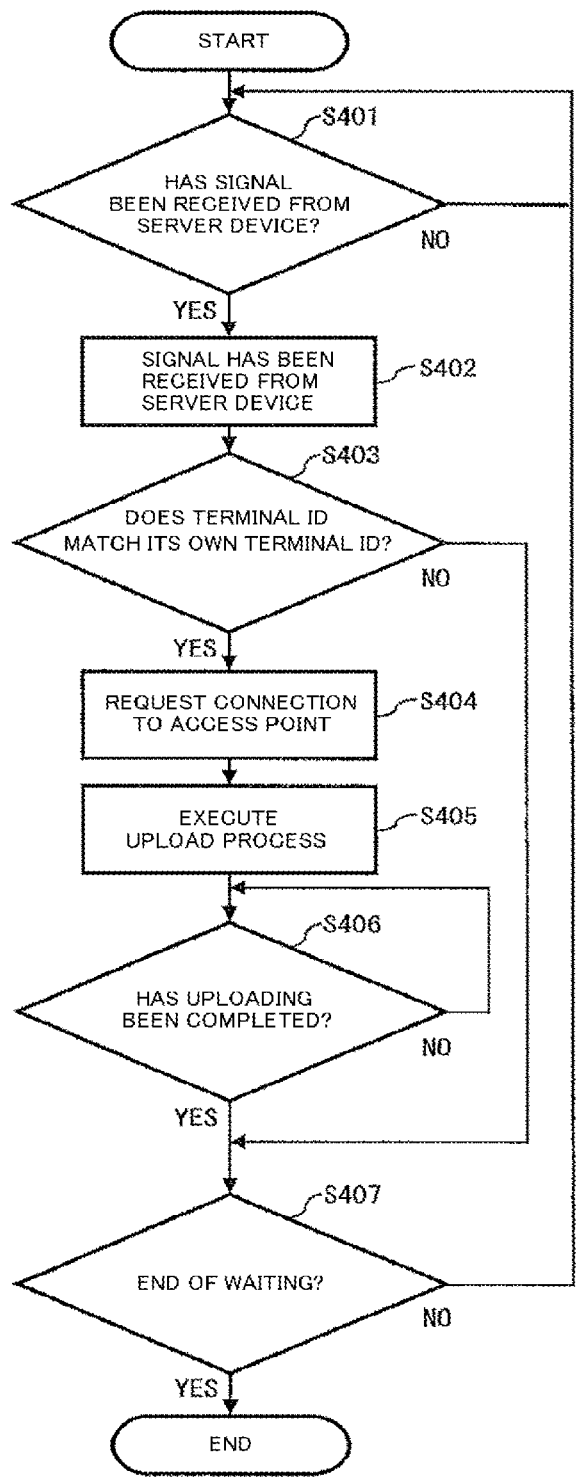
FIG. 11 is a flowchart showing an example non-limiting data communication method of the mobile terminal 4 in the variation of the present exemplary embodiment.

FIG. 9 shows an example non-limiting structure of data stored in the identification information storage unit 202 of the server device 2 in such a variation. FIGS. 10 and 11 are flowcharts showing an example non-limiting data communication method in the server device 2 and the mobile terminal 4 of the variation. As shown in FIG. 9, in the identification information storage unit 202 of the server device 2, "upload completion date and time" indicating the completion of an upload process are managed and stored as communication state information corresponding to each terminal ID. As shown in FIGS. 10 and 11, in the server device 2, instead of the download request command, an upload request command which is used to request the mobile terminal 4 to upload data is generated (step S302), and thereafter, a data upload process is executed between the mobile terminal 4 and the server device 2 (steps S305 and S405). In this case, in the server device 2, by checking the correctness of uploaded data, the data transmission/reception state is detected (step S306), and based on the detection result, the communication state information in the identification information storage unit 202 is updated (step S307).

The communication state information managed in the identification information storage unit 202 of the server device 2 may be provided in various other forms. For example, the communication state information may be flag information which indicates whether or not data communication has been completed between the mobile terminal 4 and the server device 2 as shown in FIG. 12, or date-and-time information which indicates the date and time of completion of data communication as shown in FIG. 9.

The terminal ID stored in the identification information storage unit 202 of the server device 2 and the identification information storage unit 403 of the mobile terminal 4 may be information for identifying a group (terminal group) including a plurality of mobile terminals 4 in addition to information for identifying a specific mobile terminal 4. In this case, the ID determiner 402 of the mobile terminal 4 may determine whether or not any of the terminals ID contained in the command information corresponds to a group including this mobile terminal 4.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing device for transmitting and receiving data to and from a data server device by wireless communication, the information processing device comprising:
    an identification information storage unit configured to store specific identification information for identifying a group of a plurality of information processing devices;
    a signal receiver configured to receive a broadcast signal containing at least one piece of specific identification information transmitted from a server device;
    a determiner configured to determine whether or not any of the at least one piece of specific identification information contained in the signal received by the signal receiver corresponds to the stored specific identification information;
    a requester configured to, when the determiner determines that one of the at least one piece of specific identification information corresponds to the stored specific identification information, request the data server device to transmit or receive data different from the signal; and
    a data communicator configured to, in accordance with the requester having requested the data server device to transmit or receive the data, transmit or receive the data to or from the data server device by wireless communication, wherein
    the group of the plurality of information processing devices is some of all information processing devices to which the server device can transmit the broadcast signal.

2. The information processing device of claim 1, wherein the signal receiver receives the signal in a synchronization scheme.

3. The information processing device of claim 1, wherein the signal receiver receives the signal containing a command for the request, and
    the requester requests transmission or reception of the data when the signal contains the command.

4. The information processing device of claim 1, wherein the data communicator uploads the data to the data server device.

5. The information processing device of claim 1, wherein the data communicator downloads the data from the data server device.

6. The information processing device of claim 1, wherein the stored specific identification information is used to identify a specific information processing device.

7. A data communication system in which data is transmitted and received between a data server device and an information processing device or devices by wireless communication, wherein
    each of the information processing device or devices includes
        an identification information storage unit configured to store specific identification information for identifying a group of a plurality of information processing devices;
        a signal receiver configured to receive a broadcast signal containing at least one piece of specific identification information transmitted from a server device;
        a determiner configured to determine whether or not any of the at least one piece of specific identification information contained in the signal received by the signal receiver corresponds to the stored specific identification information;
        a requester configured to, when the determiner determines that one of the at least one piece of specific identification information corresponds to the stored specific identification information, request the data server device to transmit or receive data different from the signal; and
        a data communicator configured to, in accordance the requester having requested the data server device to transmit or receive the data, transmit or receive data to or from the data server device by wireless communication, and the server device includes
an identification information storage unit configured to store additional specific identification information;
a signal transmitter configured to transmit a broadcast signal including at least one piece of specific identification information extracted from the additional specific identification information;

the data server device includes
a data communicator configured to, in accordance with the request by the requester, transmit or receive data to or from the information processing device or devices by wireless communication, the group of the plurality of information processing devices is some of all information processing devices to which the server device can transmit the broadcast signal.

8. A data communication method for transmitting and receiving data between a data server device and an information processing device or devices by wireless communication, the method comprising:
a signal transmission step of causing a server device to transmit a broadcast signal containing, at least, at least one piece of specific identification information extracted from at least one piece of previously stored specific identification information for identifying a group of a plurality of information processing devices;
a signal reception step of causing the information processing device or devices to receive the signal from the server device;
a determination step of causing each of the information processing device or devices to determine whether or not any of the at least one piece of specific identification information contained in the signal received in the signal reception step corresponds to the previously stored specific identification information;
a request step of causing each of the information processing device or devices to, when the determination step determines that one of the at least one piece of specific identification information corresponds to the previously stored specific identification information, request the data server device to transmit or receive data different from the signal; and
a data communication step of causing the information processing device or devices and the data server device to transmit or receive data by wireless communication in accordance with the request, wherein
the group of the plurality of information processing devices is some of all information processing devices to which the server device can transmit the broadcast signal.

9. A non-transitory computer-readable storage medium storing a data communication program for transmitting and receiving data to and from a data server device by wireless communication, the program causing a computer to execute:
receiving a broadcast signal containing at least one piece of specific identification information transmitted from a server device;
determining whether or not any of the at least one piece of specific identification information contained in the received signal corresponds to previously stored specific identification information for identifying a group of a plurality of information processing devices;
requesting the data server device to transmit or receive data different from the signal when it is determined that one of the at least one piece of specific identification information corresponds to the previously stored specific identification information; and
transmitting or receiving data to or from the data server device by wireless communication in accordance with the request, wherein
the group of the plurality of information processing devices is some of all information processing devices to which the server device can transmit the broadcast signal.

10. An information processing device for transmitting and receiving data to and from a data server device by wireless communication, the information processing device comprising:
an identification information storage configured to store specific identification information for identifying a group of a plurality of information processing devices;
processing circuitry at least configured to:
receive a broadcast signal containing at least one piece of specific identification information transmitted from a server device;
determine whether or not any of the at least one piece of specific identification information contained in the received signal corresponds to the stored specific identification information; and
when one of the at least one piece of specific identification information is determined to correspond to the stored specific identification information, request the data server device to transmit or receive data different from the signal; and
a wireless data transmitter/receiver configured to, in accordance with the requester having requested the data server device to transmit or receive the data, transmit or receive the data to or from the data server device by wireless communication, wherein
the group of the plurality of information processing devices is some of all information processing devices to which the server device can transmit the broadcast signal.

* * * * *